United States Patent
Wagner et al.

(10) Patent No.: US 10,647,002 B2
(45) Date of Patent: May 12, 2020

(54) SYSTEMS AND METHODS FOR PROVIDING DYNAMIC ROBOTIC CONTROL SYSTEMS

(71) Applicant: Berkshire Grey, Inc., Lexington, MA (US)

(72) Inventors: Thomas Wagner, Concord, MA (US); Kevin Ahearn, Fort Mill, SC (US); Michael Dawson-Haggerty, Pittsburgh, PA (US); Christopher Geyer, Arlington, MA (US); Thomas Koletschka, Cambridge, MA (US); Kyle Maroney, North Attleboro, MA (US); Matthew T. Mason, Pittsburgh, PA (US); Gene Temple Price, Cambridge, MA (US); Joseph Romano, Somerville, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey, Inc., Lexington, MA (US)

( * ) Notice: Subject to any disclaimer, the term of this patent is extended or adjusted under 35 U.S.C. 154(b) by 0 days.

(21) Appl. No.: 15/254,592

(22) Filed: Sep. 1, 2016

(65) Prior Publication Data
US 2017/0080571 A1     Mar. 23, 2017

Related U.S. Application Data

(60) Provisional application No. 62/221,976, filed on Sep. 22, 2015, provisional application No. 62/212,697, filed on Sep. 1, 2015.

(51) Int. Cl.
*B25J 9/16*     (2006.01)
*B25J 15/06*     (2006.01)
*B25J 13/08*     (2006.01)

(52) U.S. Cl.
CPC .......... *B25J 9/1694* (2013.01); *B25J 9/1602* (2013.01); *B25J 9/1612* (2013.01); *B25J 13/081* (2013.01);
(Continued)

(58) Field of Classification Search
None
See application file for complete search history.

(56) References Cited

U.S. PATENT DOCUMENTS

| 4,557,659 A | 12/1985 | Scaglia |
| 4,604,787 A | 8/1986 | Silvers, Jr. |

(Continued)

FOREIGN PATENT DOCUMENTS

| CA | 2928645 A1 | 4/2015 |
| CH | 701886 A2 | 3/2011 |

(Continued)

OTHER PUBLICATIONS

International Search Report and the Written Opinion issued by the International Searching Authority dated Nov. 18, 2016 in related International Application No. PCT/US2016/049935.

(Continued)

*Primary Examiner* — Ryan Rink
(74) *Attorney, Agent, or Firm* — Gesmer Ugdegrove, LLP

(57) ABSTRACT

An articulated arm system is disclosed that includes an articulated arm including an end effector, and a robotic arm control systems including at least one sensor for sensing at least one of the position, movement or acceleration of the articulated arm, and a main controller for providing computational control of the articulated arm, and an on-board controller for providing, responsive to the at least one sensor, a motion signal that directly controls at least a portion of the articulated arm.

39 Claims, 9 Drawing Sheets

(52) U.S. Cl.
CPC ........... *B25J 13/085* (2013.01); *B25J 13/086* (2013.01); *B25J 15/0616* (2013.01); *G05B 2219/37401* (2013.01); *G05B 2219/39529* (2013.01); *G05B 2219/39531* (2013.01); *G05B 2219/39533* (2013.01); *G05B 2219/39555* (2013.01); *G05B 2219/39556* (2013.01); *G05B 2219/39558* (2013.01)

(56) References Cited

U.S. PATENT DOCUMENTS

| | | | |
|---|---|---|---|
| 4,677,778 A | | 7/1987 | Sorimachi et al. |
| 4,786,847 A | * | 11/1988 | Daggett .................. B25J 9/1633 318/568.2 |
| 4,896,357 A | | 1/1990 | Hagano et al. |
| 5,764,013 A | | 6/1998 | Yae |
| 5,777,267 A | | 7/1998 | Szydel |
| 5,860,900 A | | 1/1999 | Dunning et al. |
| 5,865,487 A | | 2/1999 | Gore et al. |
| 6,059,092 A | | 5/2000 | Jerue et al. |
| 6,446,175 B1 | * | 9/2002 | West .................. G06F 11/1456 711/161 |
| 6,817,639 B2 | | 11/2004 | Schmalz et al. |
| 7,263,890 B2 | | 9/2007 | Takahashi |
| 7,313,464 B1 | | 12/2007 | Perreault et al. |
| 7,474,939 B2 | | 1/2009 | Oda et al. |
| 7,677,622 B2 | | 3/2010 | Dunkmann et al. |
| 8,070,203 B2 | | 12/2011 | Schaumberger |
| 8,874,270 B2 | | 10/2014 | Ando |
| 8,936,291 B2 | | 1/2015 | Yasuda et al. |
| 9,061,868 B1 | | 6/2015 | Paulsen et al. |
| 9,227,323 B1 | | 1/2016 | Konolige et al. |
| 9,259,844 B2 | | 2/2016 | Xu et al. |
| 9,266,237 B2 | | 2/2016 | Nomura |
| 9,283,680 B2 | | 3/2016 | Yasuda et al. |
| 9,486,926 B2 | | 11/2016 | Kawano |
| 9,492,923 B2 | | 11/2016 | Wellman et al. |
| 9,604,363 B2 | | 3/2017 | Ban |
| 9,687,982 B1 | | 6/2017 | Jules et al. |
| 9,981,379 B1 | | 5/2018 | Youmans et al. |
| 9,999,977 B2 | | 6/2018 | Wagner et al. |
| 10,007,827 B2 | | 6/2018 | Wagner et al. |
| 10,118,300 B2 | | 11/2018 | Wagner et al. |
| 10,315,315 B2 | | 6/2019 | Wagner et al. |
| 10,335,956 B2 | | 7/2019 | Wagner et al. |
| 10,399,236 B2 | | 9/2019 | Wagner et al. |
| 2001/0056313 A1 | | 12/2001 | Osborne, Jr. |
| 2002/0068994 A1 | * | 6/2002 | Hong .................. G05B 19/4155 700/245 |
| 2002/0157919 A1 | | 10/2002 | Sherwin |
| 2003/0075051 A1 | | 4/2003 | Watanabe et al. |
| 2006/0242785 A1 | * | 11/2006 | Cawley .................. B65G 47/91 15/321 |
| 2010/0040450 A1 | * | 2/2010 | Parnell .................. B25J 15/0052 414/752.1 |
| 2010/0094461 A1 | | 4/2010 | Roth et al. |
| 2010/0101346 A1 | * | 4/2010 | Johnson .................. B25J 9/1641 74/405 |
| 2010/0109360 A1 | | 5/2010 | Meisho |
| 2010/0125361 A1 | | 5/2010 | Mougin et al. |
| 2010/0175487 A1 | | 7/2010 | Sato |
| 2010/0180711 A1 | | 7/2010 | Kilibarda et al. |
| 2010/0234857 A1 | * | 9/2010 | Itkowitz .................. G09B 23/285 606/130 |
| 2010/0241260 A1 | | 9/2010 | Kilibarda et al. |
| 2011/0176148 A1 | | 7/2011 | Briggs et al. |
| 2011/0206494 A1 | * | 8/2011 | Lockie .................. A01K 41/065 414/802 |
| 2011/0243707 A1 | | 10/2011 | Dumas et al. |
| 2013/0006417 A1 | * | 1/2013 | Sanders .................. H04L 47/13 700/245 |
| 2013/0110280 A1 | | 5/2013 | Folk |
| 2013/0166061 A1 | | 6/2013 | Yamamoto |
| 2013/0218335 A1 | | 8/2013 | Barajas et al. |
| 2013/0232919 A1 | | 9/2013 | Jaconelli |
| 2013/0245824 A1 | | 9/2013 | Barajas et al. |
| 2013/0343640 A1 | | 12/2013 | Buehler et al. |
| 2013/0345872 A1 | | 12/2013 | Brooks et al. |
| 2014/0005831 A1 | | 1/2014 | Naderer et al. |
| 2014/0067121 A1 | | 3/2014 | Brooks et al. |
| 2014/0067127 A1 | | 3/2014 | Gotou |
| 2014/0088763 A1 | | 3/2014 | Hazan |
| 2014/0154036 A1 | | 6/2014 | Matttern et al. |
| 2014/0200711 A1 | * | 7/2014 | Douba .................. B30B 15/148 700/206 |
| 2014/0244026 A1 | | 8/2014 | Neiser |
| 2014/0298231 A1 | | 10/2014 | Saito et al. |
| 2014/0305847 A1 | | 10/2014 | Kudrus |
| 2015/0032252 A1 | | 1/2015 | Galluzzo et al. |
| 2015/0057793 A1 | | 2/2015 | Kawano |
| 2015/0073589 A1 | | 3/2015 | Khodl et al. |
| 2015/0081090 A1 | | 3/2015 | Dong |
| 2015/0190925 A1 | | 7/2015 | Hoffman et al. |
| 2015/0203340 A1 | | 7/2015 | Jacobsen et al. |
| 2015/0224650 A1 | | 8/2015 | Xu et al. |
| 2015/0298316 A1 | | 10/2015 | Accou et al. |
| 2015/0306770 A1 | * | 10/2015 | Mittal ...................... B25J 5/007 700/255 |
| 2015/0328779 A1 | * | 11/2015 | Bowman ............... B65H 3/0883 294/188 |
| 2015/0346708 A1 | | 12/2015 | Mattern et al. |
| 2015/0352721 A1 | | 12/2015 | Wicks et al. |
| 2015/0375398 A1 | | 12/2015 | Penn et al. |
| 2015/0375401 A1 | * | 12/2015 | Dunkmann ............ B65G 47/91 700/228 |
| 2016/0031077 A1 | * | 2/2016 | Inaba ..................... B25J 9/0081 700/264 |
| 2016/0101526 A1 | | 4/2016 | Saito et al. |
| 2016/0136816 A1 | | 5/2016 | Pistorino |
| 2016/0167227 A1 | | 6/2016 | Wellman et al. |
| 2016/0176043 A1 | | 6/2016 | Mishra et al. |
| 2016/0221187 A1 | | 8/2016 | Bradski et al. |
| 2016/0243704 A1 | | 8/2016 | Vakanski et al. |
| 2016/0271805 A1 | | 9/2016 | Kuolt et al. |
| 2016/0347545 A1 | | 12/2016 | Lindbo et al. |
| 2017/0021499 A1 | | 1/2017 | Wellman et al. |
| 2017/0036354 A1 | | 2/2017 | Chavan Dafle et al. |
| 2017/0043953 A1 | | 2/2017 | Battles et al. |
| 2017/0050315 A1 | | 2/2017 | Henry et al. |
| 2017/0057091 A1 | | 3/2017 | Wagner et al. |
| 2017/0080566 A1 | | 3/2017 | Stubbs et al. |
| 2017/0080579 A1 | | 3/2017 | Wagner et al. |
| 2017/0087718 A1 | | 3/2017 | Wagner et al. |
| 2017/0087731 A1 | | 3/2017 | Wagner et al. |
| 2017/0106532 A1 | | 4/2017 | Wellman et al. |
| 2017/0120455 A1 | | 5/2017 | Wagner et al. |
| 2017/0121113 A1 | | 5/2017 | Wagner et al. |
| 2017/0136632 A1 | | 5/2017 | Wagner et al. |
| 2017/0157648 A1 | | 6/2017 | Wagner et al. |
| 2017/0197316 A1 | | 7/2017 | Wagner et al. |
| 2017/0225330 A1 | | 8/2017 | Wagner et al. |
| 2017/0305694 A1 | | 10/2017 | McMurrough et al. |
| 2017/0322561 A1 | | 11/2017 | Stiernagle |
| 2018/0043527 A1 | * | 2/2018 | Koga ..................... B25J 9/0093 |
| 2018/0127219 A1 | | 5/2018 | Wagner et al. |
| 2018/0148272 A1 | | 5/2018 | Wagner et al. |
| 2018/0265298 A1 | | 9/2018 | Wagner et al. |
| 2018/0273295 A1 | | 9/2018 | Wagner et al. |
| 2018/0273296 A1 | | 9/2018 | Wagner et al. |
| 2018/0273297 A1 | | 9/2018 | Wagner et al. |
| 2018/0273298 A1 | | 9/2018 | Wagner et al. |
| 2018/0281202 A1 | | 10/2018 | Brudniok et al. |
| 2018/0282065 A1 | | 10/2018 | Wagner et al. |
| 2018/0282066 A1 | | 10/2018 | Wagner et al. |
| 2018/0312336 A1 | | 11/2018 | Wagner et al. |
| 2018/0327198 A1 | | 11/2018 | Wagner et al. |
| 2018/0330134 A1 | | 11/2018 | Wagner et al. |
| 2018/0333749 A1 | | 11/2018 | Wagner et al. |

(56) References Cited

U.S. PATENT DOCUMENTS

| | | | |
|---|---|---|---|
| 2019/0001505 A1 | 1/2019 | Wagner et al. | |
| 2019/0329979 A1 | 10/2019 | Wicks et al. | |

FOREIGN PATENT DOCUMENTS

| | | |
|---|---|---|
| EP | 0317020 A2 | 5/1989 |
| EP | 0613841 A1 | 9/1994 |
| EP | 1256421 B1 | 4/2002 |
| EP | 1671906 A1 | 6/2006 |
| EP | 2181814 A1 | 5/2010 |
| EP | 2960024 A2 | 12/2015 |
| WO | 2010034044 A2 | 1/2010 |
| WO | 2015162390 A1 | 10/2015 |
| WO | 2016070412 A1 | 5/2016 |
| WO | 2017044632 A1 | 3/2017 |
| WO | 2018017616 A1 | 7/2017 |

OTHER PUBLICATIONS

Hebert et al. "A Robotic Gripper System for Limp Material Manipulation: Hardware and Software Development and Integration", Proceedings of the 1997 IEEE International Conference on Robotics and Automation. Albuquerque, Apr. 20-27, 1997; [Proceedings of the IEEE International Conference on Robotics and Automation], New York, IEEE, US, vol. Conf. 14, Apr. 20, 1997 ( Apr. 20, 1997), pp. 15-21.

Moura et al. "Neural Network Based Perturbation Identification Approach for High Accuracy Tracking Control of Robotic Manipulators", Proceedings of the International Mechanical Engineering Congress and Exposition—IMECE—ASME, XX, XX, Nov. 1, 2003 (Nov. 1, 2003), pp. 1189-1197.

Vittor et al. "A Flexible Robotic Gripper for Automation of Assembly Tasks: A technology study on a gripper for operation in shared human environments", Assembly and Manufacturing (ISAM), 2011 IEEE International Symposium on, IEEE, May 25, 2011 (May 25, 2011), pp. 1-6.

Liu et al. "Hand-Arm Coordination for a Tomato Harvesting Robot Based on Commercial Manipulator", 2013 IEEE International Conference on Robotics and Biomimetics (ROBIO), Shenzhen China, IEEE, Dec. 12, 2013 (Dec. 12, 2013) pp. 2715-2720.

International Preliminary Report on Patentability issued by the International Bureau of WIPO in related International Patent Application No. PCT/US2016/049935 dated Mar. 15, 2018.

Office Action issue by Canadian Intellectual Property Office in related Canadian Patent Application No. 2,997,280 dated Jun. 6, 2019, 4 pgs.

Communication pursuant to Rules 161(1) and 162 EPC issued by the European Patent Office in related European Patent Application No. 16766742.7 dated Apr. 10, 2018, 3 pages.

* cited by examiner

SYSTEMS AND METHODS FOR PROVIDING DYNAMIC ROBOTIC CONTROL SYSTEMS

PRIORITY

The present application claims priority to U.S. Provisional Patent Application Ser. No. 62/212,697 filed Sep. 1, 2015 and U.S. Provisional Patent Application Ser. No. 62/221,976 filed Sep. 22, 2015, the disclosures of which are herein incorporated by reference in their entireties.

BACKGROUND

The invention generally relates to robotics, and relates in particular to robotic control systems that are designed to accommodate a wide variety of unexpected conditions and loads.

Most industrial robotic systems operate in a top-down manner, generally as follows: a controller samples a variety of sensors, and then logic on that same controller computes whether or not to take action. The benefit of this logic flow (usually referred to as "polling") is that all of the control logic is in the same place. The disadvantage is that in practical robotic systems, the signals are often sampled quite slowly. Also, all sensors must be wired to the control cabinet leading to long and error-prone cable runs.

A specific example of this traditional architecture would generally be implemented by a legacy robot supplier such as those sold by ABB Robotics, Inc. of Auburn Hills, Mich., Kuka Roboter GmbH of Germany, Fanuc America Corporation of Rochester Hills, Mich., or one of their top-tier integrators. All of these suppliers generally encourage the same architecture, and have similar form factors. For example: a welding cell used in an automotive facility might have an ABB IRC5 control cabinet, an ABB IRB2600 1.85 m reach 6 degree of freedom robot, a Miller GMAW welding unit wired over an industrial bus (Devicenet/CANbus) to the IRC5, and an endo-farm tooling package mounting a GMAW torch (e.g., a Tregaskiss Tough Gun). All programming is done on the IRC5, and the end effector has no knowledge of the world, and things like crashes can only be observed or prevented on the IRC5, which is itself quite limited.

Again, in such systems, however, the signals are often sampled relatively slowly and sensors must generally be wired to the control cabinet. There remains a need therefore, for a robotic control system that is able to efficiently and reliably provide dynamic control and responsiveness to conditions in the environment of the robot.

SUMMARY

In accordance with an embodiment, the invention provides an articulated arm system that includes an articulated arm including an end effector, and a robotic arm control systems including at least one sensor for sensing at least one of the position, movement or acceleration of the articulated arm, and a main controller for providing computational control of the articulated arm, and an on-board controller for providing, responsive to the at least one sensor, a motion signal that directly controls at least a portion of the articulated arm.

In accordance with another embodiment, the invention provides an articulated arm system including an articulated arm including an end effector, and an articulated arm control system including at least one sensor for sensing at least one of the position, movement or acceleration of the articulated arm, a main controller for providing computational control of the articulated arm, and an on-board controller for providing, responsive to the at least one sensor, a control signal to the main controller.

In accordance with another embodiment, the invention provides a method of providing a control signal to an end effector of an articulated arm. The method includes the steps of providing a main control signal from a main controller to the end effector of the articulated arm, receiving a sensor input signal from at least one sensor positioned proximate the end effector, and at least partially modifying the main control signal responsive to the sensor input signal.

In accordance with a further embodiment, the invention provides a method of providing a control signal to an end effector of an articulated arm. The method includes the steps of providing a main control signal from a main controller to the end effector of the articulated arm, receiving a sensor input signal from a sensor positioned proximate the end effector, and overriding the main control signal responsive to the sensor input signal.

BRIEF DESCRIPTION OF THE ILLUSTRATED EMBODIMENTS

The following description may be further understood with reference to the accompanying drawings in which.

The drawings are shown for illustrative purposes only.

DETAILED DESCRIPTION

In accordance with an embodiment, the invention provides an architecture for robotic end effectors that allows the end effector to alter the state of the robot. In accordance with certain embodiments, the end effector may observe the environment at a very high frequency and compare local sensor data and observations to a set of formulas or trigger events. This allows for robot-agnostic low latency motion primitive routines, such as for example move until suction and move until force without requiring the full response time of the robotic main controller. A robotic end effector is therefore provided that can alter the state of the robot, and further that may be modified during run time based on a variety of control policies. In accordance with further embodiments, the invention provides a multifaceted gripper design strategy has also been developed for multimodal gripping without tool changers.

A majority of industrial robotic systems execute their programming logic control in one place only—in the robot controller. The robot controller in these systems is often a large legacy controller with an obscure and (and sometimes poorly featured) programming language. In contrast, the majority of modern and emerging robotic systems contain logic distributed between a robot controller and several workstation computers running a modern operating system and software stack, such as the Ubuntu operating system as sold by Canonical Ltd. of Isle Of Man, the Linux operating system as provided by The Linux Foundation of San Francisco, Calif. and the ROS robotic operating environment as provided by Open Source Robotics Foundation of San Francisco, Calif.

A positive aspect of these architectures is that they provide tremendous, even arbitrary, amounts of computing power that may be directed towards problems like motion planning, localization, computer vision, etc. The downsides of this architecture are primarily that going through high-level middleware such as ROS adds significant latency, and evaluating a control policy in a loop may see round trip times of well over 100 ms.

As a unifying solution for this problem, a gripper control system has been developed with onboard electronics, sensors, and actuators to which high level logic controlling the system uploads a set of 'triggers' at runtime. These are control policies, such as stop the robot when a force above X Newtons is observed, or when object is observed by depth sensor, slow down the trajectory. The end effector may then evaluate the policy natively at the kHz level, and trigger actions of situations where the gripper should take an action.

Figure 1:
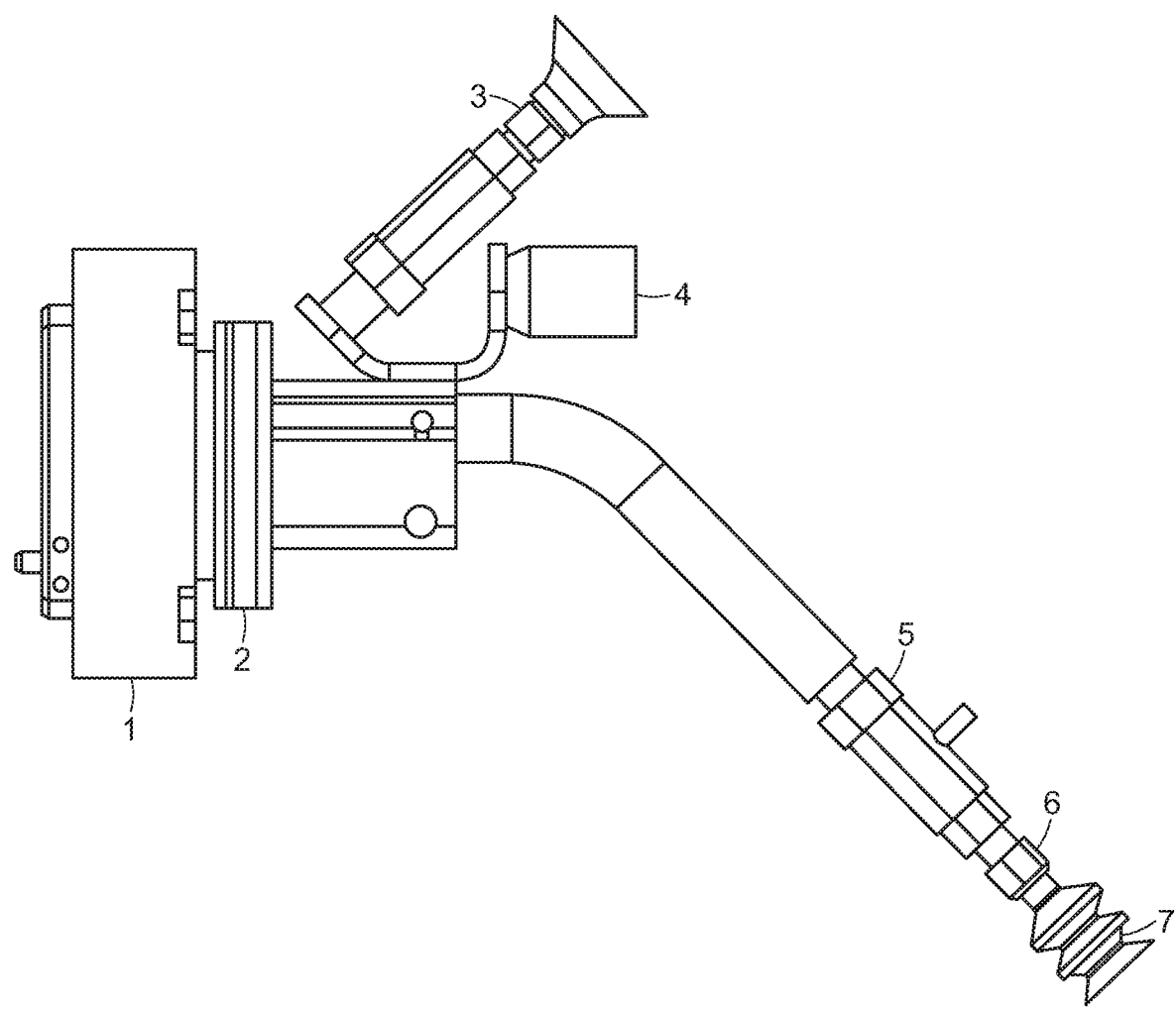
FIG. 1 shows an illustrative diagrammatic view of an end effector used in a robotic system in accordance with an embodiment of the invention.

FIG. 1 shows a portion of an articulated arm assembly that includes a force sensor system 1, on-board control electronics 2, a vacuum end effector 3, a three dimensional depth sensor system 4, an input pressure sensor 5, an output pressure sensor 6, and another vacuum end effector 7. The articulated arm therefore includes on-board control electronics 2 as well as multiple end effectors 3, 7. In certain embodiments, the articulated arm may include a further end effector similar to end effector 3 that is adjacent end effector 3 (and is therefore not shown in FIG. 1).

Figure 2:
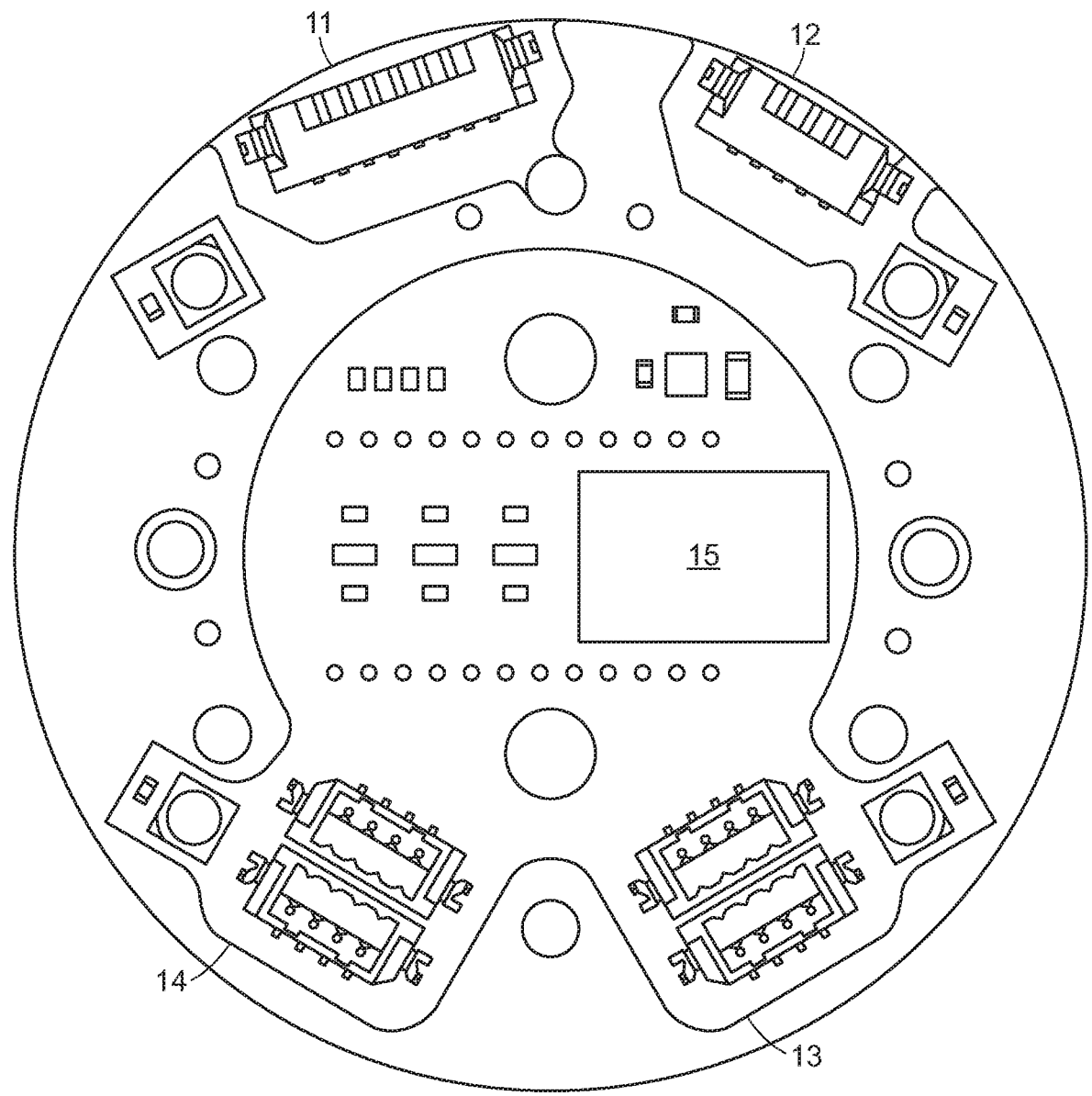
FIG. 2 shows an illustrative diagrammatic view of an on-board controller used in the end effector of FIG. 1.

FIG. 2 shows the on-board control electrics 2, which includes connectors 11 for the force sensors, connectors 12 for the robot, connectors 13 for the pressure sensors, connectors 14 for LEDs such as RGB LEDs, and connector 15 for a microcontroller with serial and wireless connections.

In accordance with an embodiment, the invention provides an articulated arm control system that includes an articulated arm with an end effector, at least one sensor for sensing at least one of the position, movement or acceleration of the articulated arm, a main controller for providing computational control of the articulated arm, and an on-board controller for providing, responsive to the at least one sensor, a control signal to the main controller.

Figure 3:
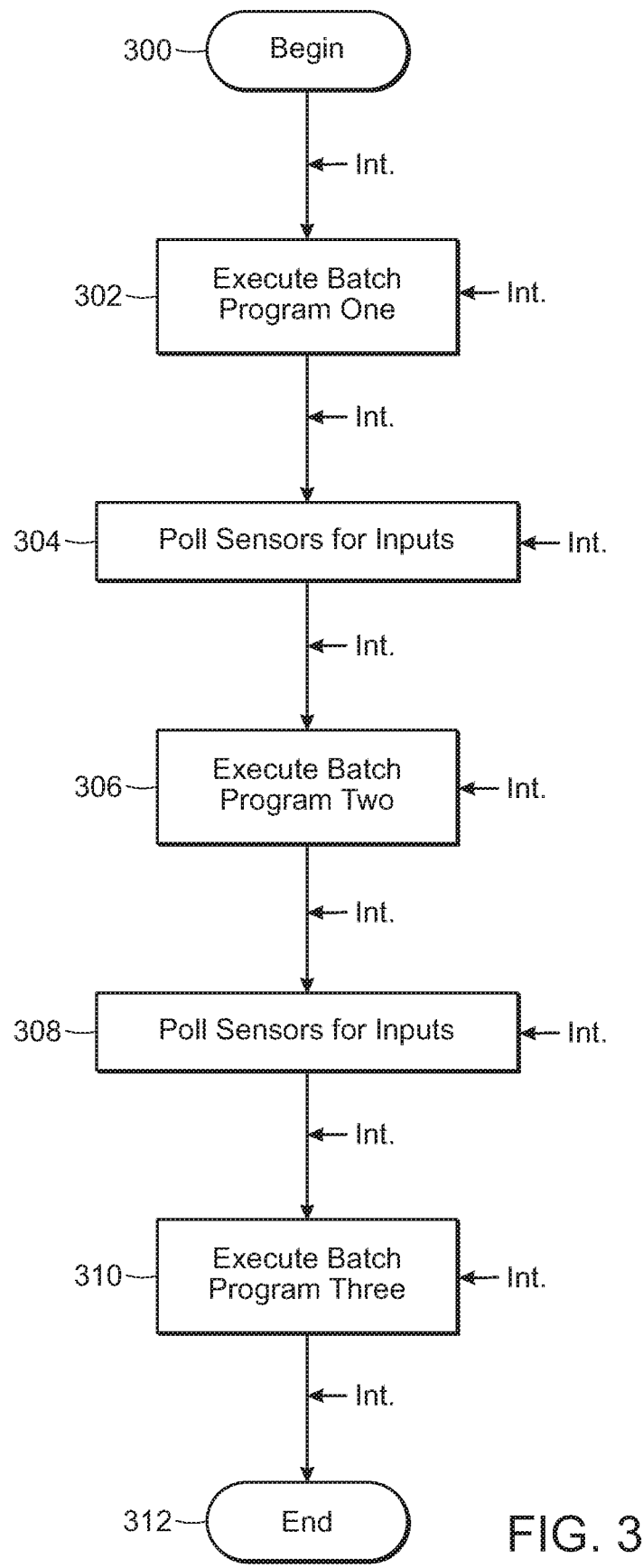
FIG. 3 shows an illustrative diagrammatic view of processing steps used by a robotic control system in accordance with an embodiment of the invention.

FIG. 3 shows, for example, shows a pre-programmed robot control routine that begins (step 300), executes a first batch program (step 302), polls sensors for inputs (step 304), executes a second batch program (step 306), polls the sensors again for inputs (step 308), executes a third batch program (step 310), and then ends (step 312). If the system is relying on sensor inputs to cause a change in the program (e.g., stop due to readings of a force sensor), the system must wait for that sensor to be polled. In accordance with embodiments of the present invention, on the other hand, interrupt signals may be provided to the main robot controller to cause pre-defined specific responses. As diagrammatically shown in FIG. 3, such interrupt signals may be received any time and immediately processed.

Figure 4:
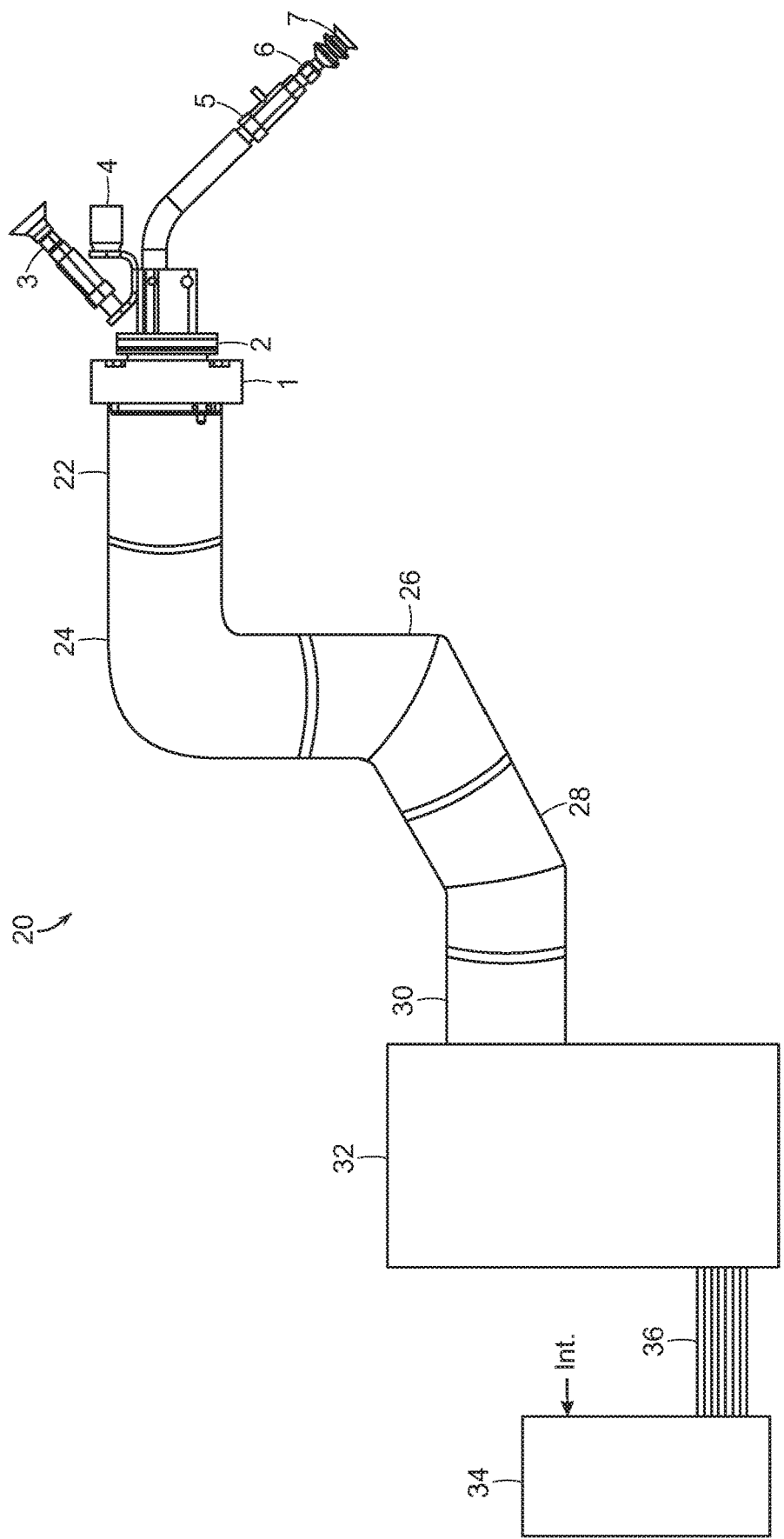
FIG. 4 shows an articulated arm system in accordance with an embodiment of the invention.

FIG. 4 shows a robotic system 20 in accordance with an embodiment of the present invention in which the articulated arm portion of FIG. 1 (including the force sensor system 1, on-board control electronics 2, the vacuum end effector 3, the three dimensional depth sensor system 4, the input pressure sensor 5, the output pressure sensor 6, and the other vacuum end effector 7) is attached to further articulated arm sections 22, 24, 26, 28 and 30. The articulated arm section 30 is attached to a robot base 32, which is coupled to a main robot controller 34 by connector cables 36. An interrupt signal may be provided from the on-board control electronics 2 to the main robot controller 34 either by direct wire connection or wirelessly.

This solution conveys several tremendous advantages: First, one may add the advanced behaviors one generates to any robot, as long as the robot complies with a relatively simple API. Second, one may avoid long cable runs for delicate signals, from the end effector to the robot control box (which is often mounted some distance away from a work cell). Third, one may respond to changes in the environment at the speed of a native control loop, often thousands of times faster than going exclusively through high level logic and middleware. Fourth, one may alter these policies at runtime, switching from move until suction to stop on loss of suction, as well as chaining policies.

In accordance with a further embodiment, the invention provides a method of altering or overriding a control signal from a main controller to an end effector.

Figure 5:
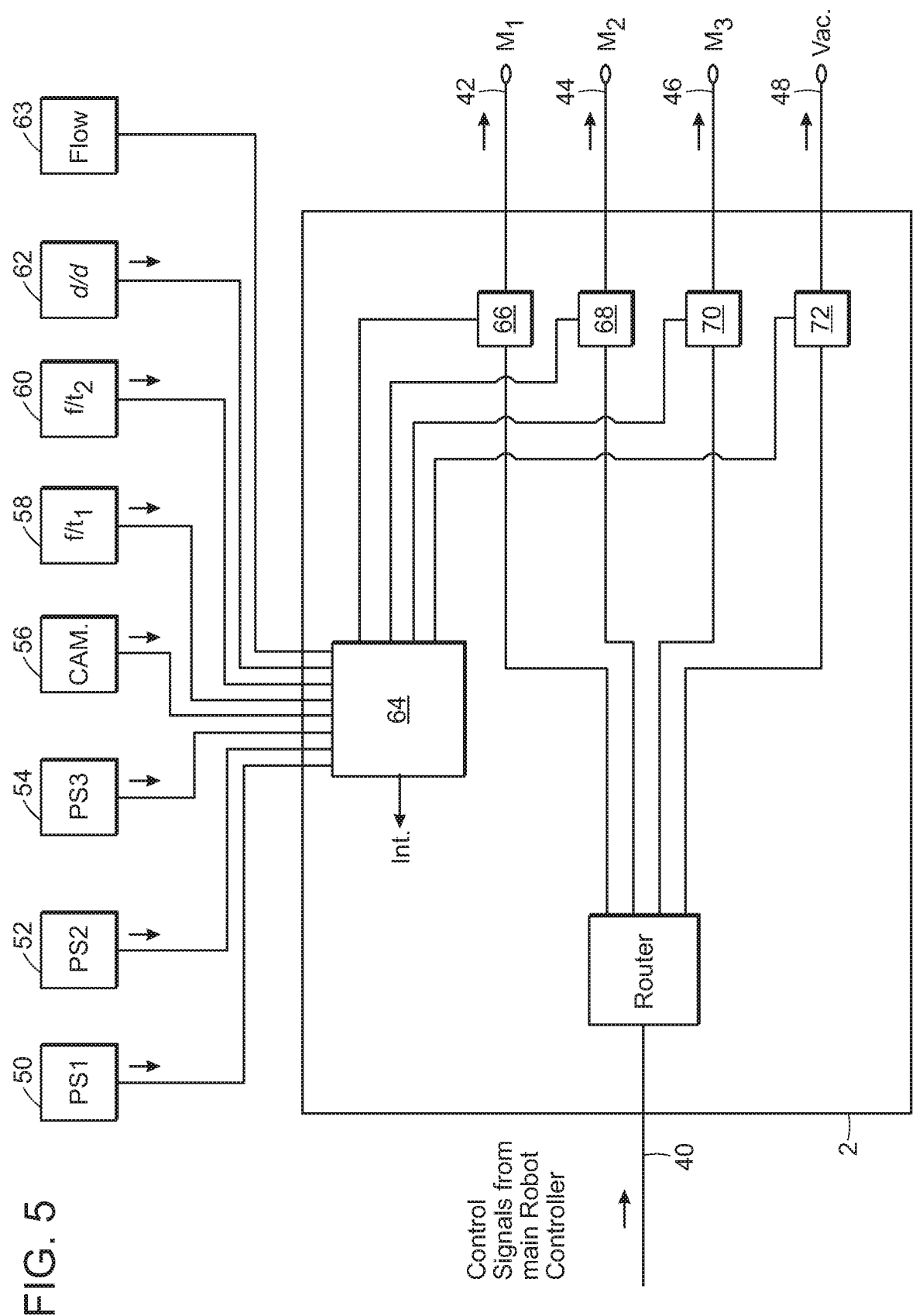
FIG. 5 shows an illustrative block diagram of a robotic control system in accordance with an embodiment of the invention.

FIG. 5, for example, shows an implementation of the on-board control electronics 2. The electronics 2 receives at 40 control signals from the main robot controller 34 (shown in FIG. 4), which causes motors M1, M2, M3 (shown at 42, 44 and 46) and the vacuum (shown at 48) of the articulated arm to move. The motors may control, for example, elbow, wrist and gripper motors of the articulated arm. In the absence of any feedback signals from the environment, the control signals 40 are routed to the appropriate motors for control of the articulated arm in accordance with the program in the main controller.

The electronics 2 however, is also coupled to input sensors including pressure sensors 50, 52 and 54, a camera 56, force/torque sensors 58, 60 deflection/deformation sensor 62 and flow sensor 63. These sensors are coupled to an on-board controller 64 that determines whether to send an interrupt signal to the main robotic controller, and determines whether to immediately take action by overriding any of the output signals to motors M1-M3 and the vacuum. This is achieved by having the on-board controller 64 be coupled to control junctions 66, 68, 70 and 72 in the control paths of the signals 42, 44, 46 and 48.

The robot, for example, may be working in very cluttered, dynamic environments. In order to manipulate objects in these conditions, one needs much more sensing than a typical, more structured, open-loop robotic system would need. The grippers are therefore instrumented with absolute pressure sensors, a 3D RGBD camera, force-torque sensor, and suction cup deflection sensing. By sensing and processing the sensor data directly at the wrist via a microcontroller hardware interrupts may be set (via digital inputs) immediately (hundreds/thousands of Hz). There is much more overhead in the other approach of communicating the sensor data back to the main robotic controller for analysis, which would be significantly slower. This allows one to modify robot motion/execution significantly faster, which in turn allows one to move the robot significantly faster, adapting at speeds not possible otherwise. In these dynamic and unpredictable environments, adapting and providing recovery quickly is vitally important.

The pressure sensors, for example, may provide binary gripping/not gripping, and threshold comparisons (>grip pressure, <required retract pressure, <drop pressure). The pressure sensors may also map material properties/selected grasps to expected pressure readings and in real-time modify trajectory execution (speeds, constraints) in order to ensure successful transportation. The pressure sensors may also provide real-time monitoring of upstream pressure (pressure from source) to ensure expected air pressure available, and modify expected suction measurements from downstream accordingly.

The camera may be an RGBD camera that provides data regarding environment registration, automated localization of expected environment components (conveyor, out shelves, out-bin stack) to remove hand tuning, and expected/unexpected objects/obstacles in the environment and modify trajectory execution accordingly.

The force-torque sensors may provide impulse interrupts. When an unusual or unexpected force or torque is encountered we can stop trajectory execution and recover, where the robot before would have continued its motion in collision with that object causing damage to the object or robot. The force-torque sensors may also provide mass/COM estimates, such as Model Free mass estimates that may inform trajectory execution to slow down as one may be dealing with higher mass and inertias at the endpoint, which are more likely to be dropped due to torqueing off. Model Based mass estimates may also be used to ensure quality of grasp above COM, make sure that the correct item is grasped, that the item is singulated, and that the item is not damaged (unexpected mass).

The deflection/deformation sensor may observe suction cup contact with the environment (typically when one wants to interrupt motion) as the bellows are deflected and have not modified pressure readings, and have not yet displayed a noticeable force impulse. The deflection sensor at its simplest will be used for interrupting motion to avoid robot Force Protective Stops by being that earliest measurement of contact. The deflection/deformation sensor may also measure the floppiness of the picks, which allows one in real-time to again modify trajectory execution, slowing down or constraining the motions to ensure successful transport, or putting it back in the bin if the floppiness is beyond a threshold at which the item may be safely transported.

The flow sensors may detect changes in the amount of airflow as compared to expected air flow values or changes. For example, upon grasping an object, it is expected that the airflow would decrease. Once an object is grasped and is being carried or just held, a sudden increase in air flow may indicate that the grasp has been compromised or that the object has been dropped. The monitoring of weight in combination with air flow may also be employed, particularly when using high flow vacuum systems.

Figure 6A:
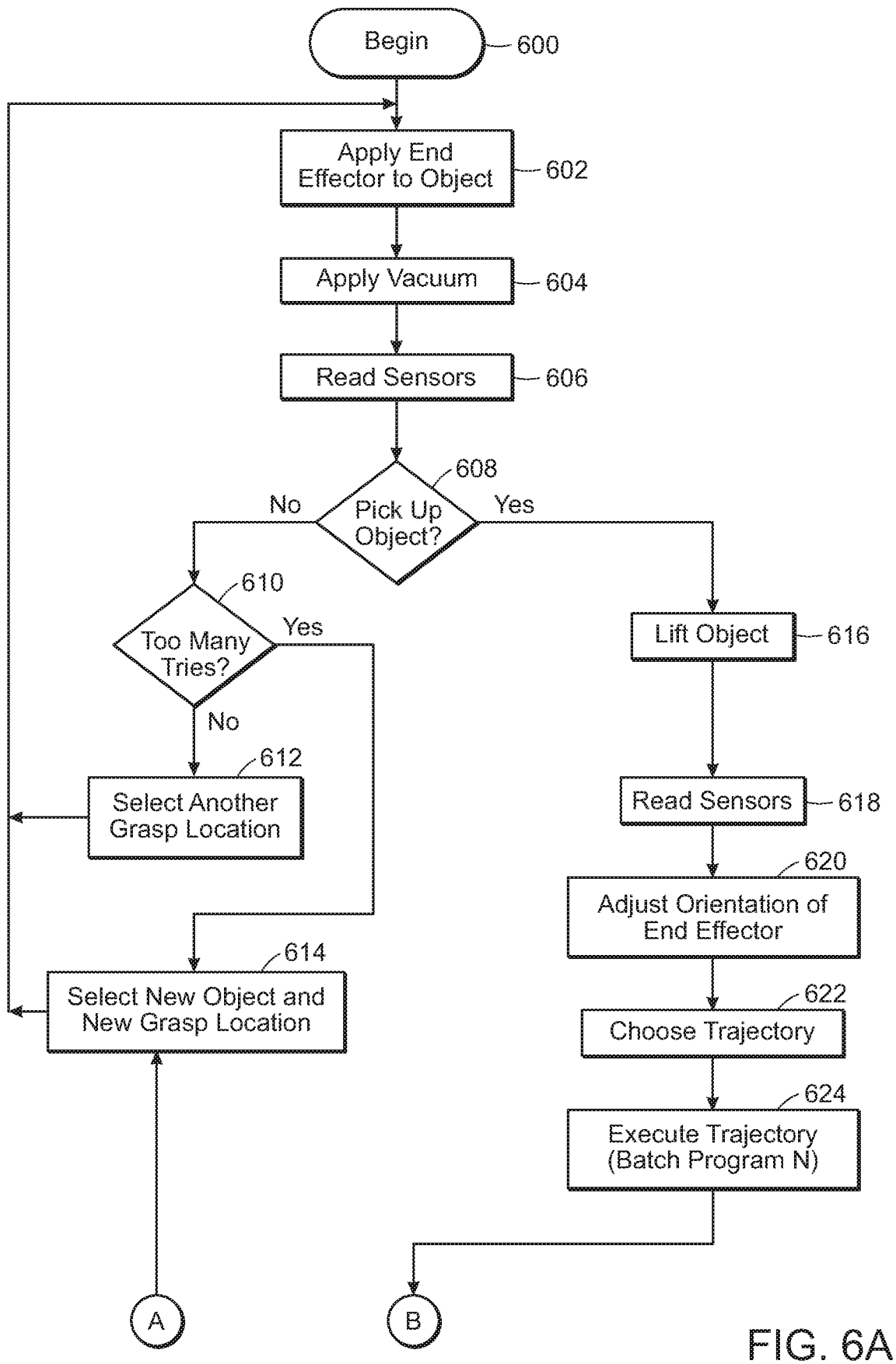
FIGS. 6A and 6B show an illustrative diagrammatic views of illustrative processing steps used by the robotic control system of FIG. 5.

With reference to FIG. 6A, the program begins (step 600), by applying the end effector to an object at a selected grasp location (step 602). A vacuum is applied to the end effector (step 604), and the sensors are polled (step 606). Responsive to the sensor inputs, the system determines whether it should try to pick up the object (step 608). For example, if too much vacuum flow is detected, the system may determine that the grasp is insufficient for picking up the object. In this case, the system will determine (step 610) whether there have already been too many tries to pick up this particular object (possibly involving the main controller). If there have not already been too many retries, the system may select another grasp location for the object (step 612) and return to step 602 above. If the system determines that there have already been too many retries, the system will select a new object and a new associated grasp location (step 614) and return to step 602 above.

If the system determines that the object should be picked up (step 608), the system will then lift the object (step 616) and then read the sensors (step 618). If the orientation of the end effector needs to be adjusted, the system adjusts the orientation of the end effector (step 620), for example to cause a heavy object to be held in tension (vertically) by the end effector as opposed to a combination of a vertical and horizontal grasp that would cause a sheer force to be applied. In another example, the system may choose the hold a lighter object with a combination of a vertical and horizontal grasp to accommodate a high speed rotation movement so that when the object is being moved, a centrifugal force will be applied in the direction aligned with the grasp of the object. Once the orientation of the end effector is chosen (step 620), the system will choose a trajectory path (step 622), and then begin execution of the trajectory, e.g., the batch program N (step 624).

Figure 6B:
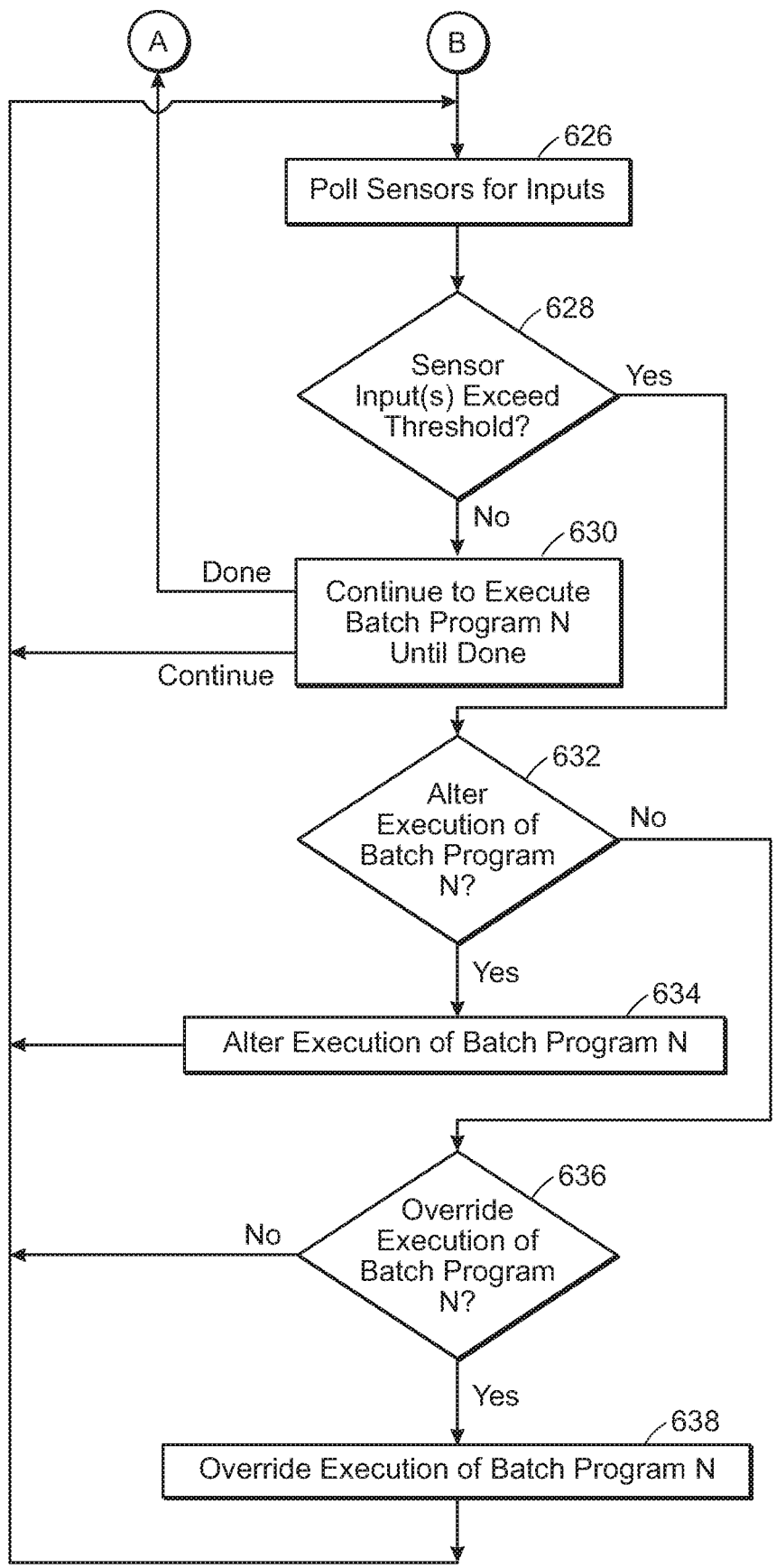

With reference to FIG. 6B, the execution of the batch program N may begin by polling the one or more sensors for inputs (step 626). If none of the inputs exceeds a defined threshold for the main control command (step 628), e.g., to move in a certain vector, then the system will continue to execute the batch program (step 630) until done (whereupon the system returns to step 614). If the batch program is not done, the system returns to step 626, polling the sensor(s) for inputs. If any of the inputs from the sensor(s) do exceed a threshold (step 628), then the system will determine whether the main control command should be altered (e.g., movement slowed or the path changed) (step 632), and if so, the program will so alter the main control command (step 634). If the main control command is not altered, the system will determine whether the main control command should be overridden (step 636), e.g., movement of the end effector should be stopped or the object should be put down for a new grasp attempt, or the object has been dropped, in which case, the system will proceed to pick up a new object and signal for cleaning by a human that an object has been dropped. In any of the exemplary cases, the program will so override the main control command (step 638). In either case, the system then returns to executing the batch program as either altered or overridden, returning to step 626 until done. If the main control signal for a batch program is changed (altered or overwritten), the main controller is also promptly notified.

In accordance with another embodiment, the invention provides an articulated arm control system includes an articulated arm with an end effector, at least one sensor for sensing at least one of the position, movement or acceleration of the articulated arm, and a main controller for providing computational control of the articulated arm, and an on-board controller for providing, responsive to the at least one sensor, a motion signal that directly controls at least a portion of the articulated arm.

Figure 7:
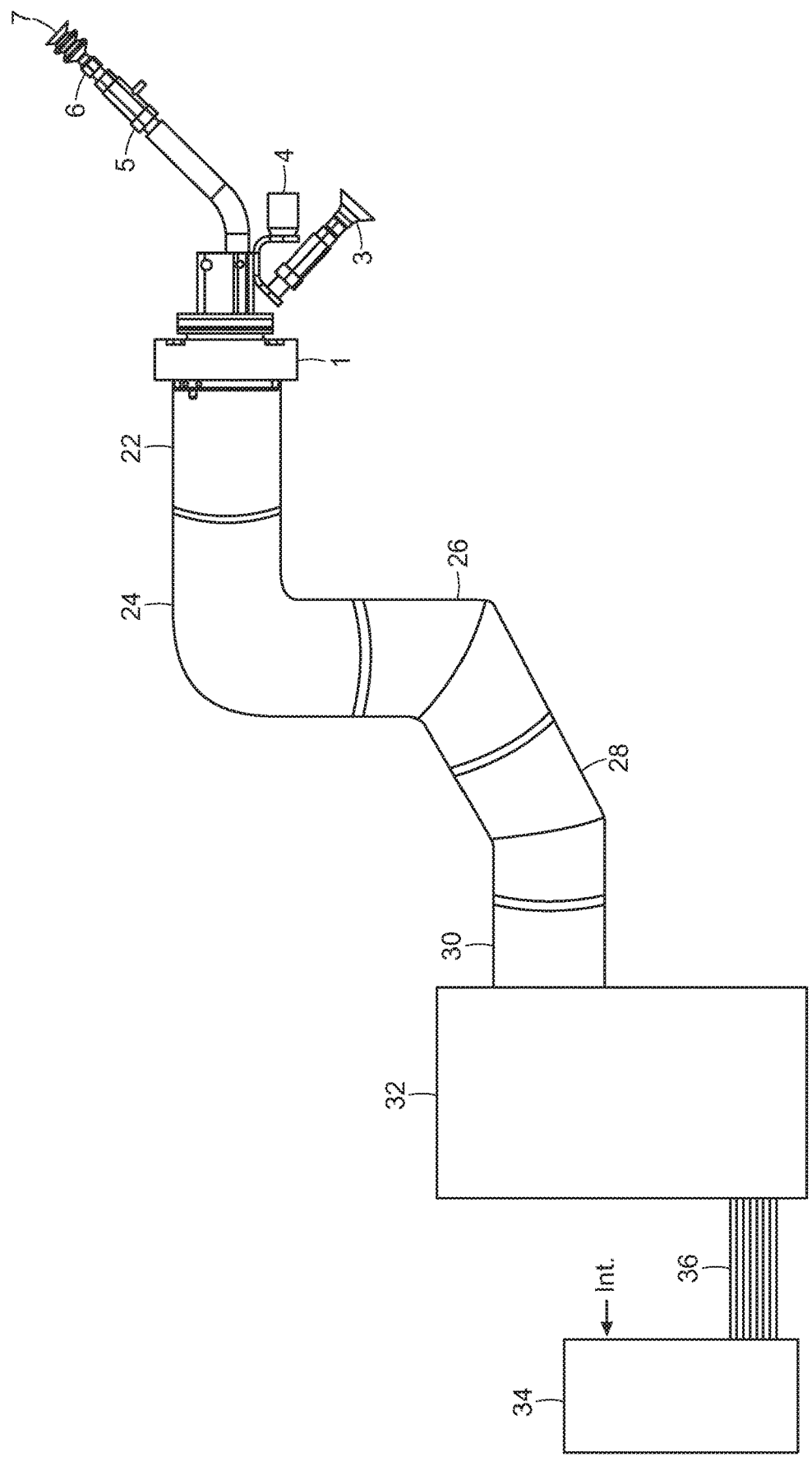
FIG. 7 shows an illustrative diagrammatic view of the articulated arm system of FIG. 4 with the end effector rotated 180 degrees.

FIG. 7, for example shows the robotic system 20 of FIG. 4 except that the articulated arm portion of FIG. 1 is rotated with respect to the articulated arm section 22 such that the vacuum end effector 3 is now positioned to engage the work environment, while the vacuum end effector 7 is moved out of the way.

A unique contribution of the articulated arm is its multiple facets for multimodal gripping, e.g., having multiple grippers packaged on a single end effector in such a way that the robot can use different grippers by orienting the end effector of the robot differently. These facets can be combined in combinations as well as used individually. Other more common approaches are tool changers, which switch a single tool out with a different one on a rack. Multimodal gripping of the present invention reduces cycle time significantly compared to tool changers, as well as being able to combine multiple aspects of a single end effector to pick up unique objects.

The gripper designs in the above embodiments that involved the use of up to three vacuum cups, may be designed specifically for picking items of less than a certain weight, such as 2.2 lbs., out of a clutter of objects, and for grasping and manipulating the bins in which the objects were provided.

The same approach to instrumentation of a vacuum grasping end effector may be applied to any arbitrary configuration of vacuum cups as well. For example, if the robotic system needs to handle boxes such as might be used for shipping of things, then arbitrary N×M arrangements of the suction cells may be created to handle the weight ranges of such packages. FIG. 8A for example shows an end effector 70 that includes a 3 by 3 array of end effector sections 72, each of which includes a vacuum cup 74. Each end effector section 72 may include pressure sensors as discussed above, and each vacuum cup 74 may include a deformation sensor that is able to detect deformation along any of three dimensions. The end effector sections 72 are mounted to a common base 76 that includes a coupling 78 for attachment to an articulated arm.

Figure 8B:
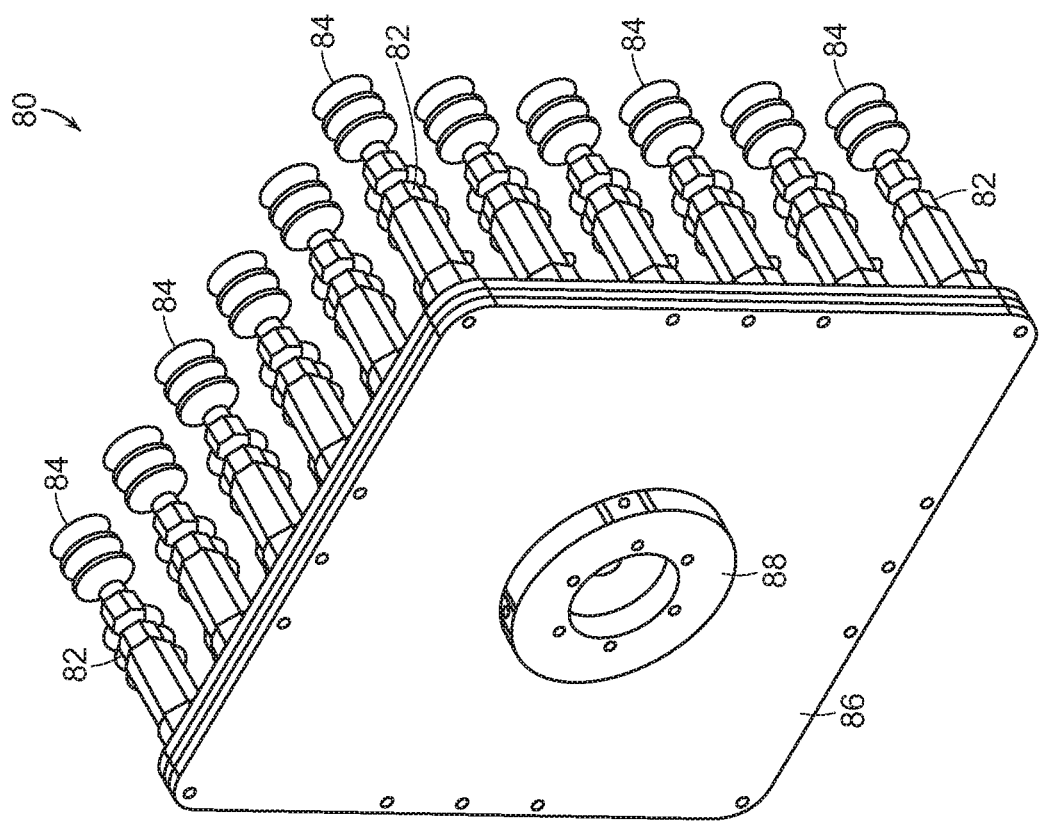
FIGS. 8A and 8B show illustrative diagrammatic views of end effectors for use in further embodiments of the invention.
Figure 8A:
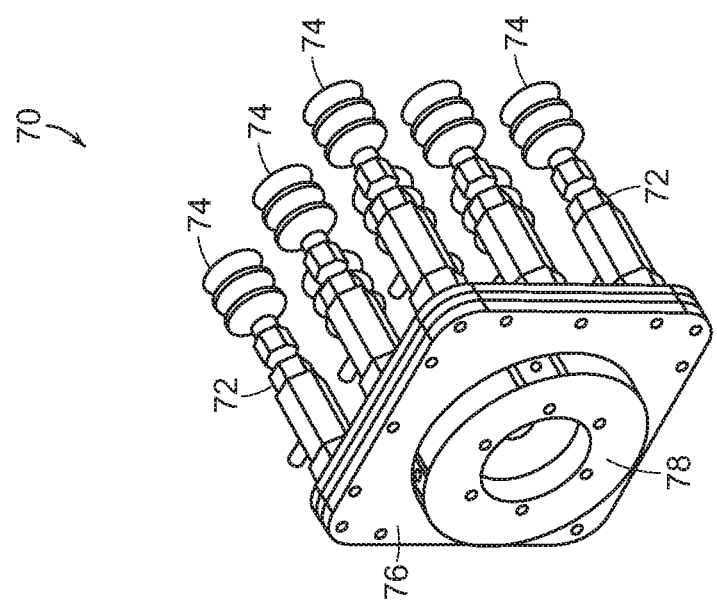

FIG. 8B shows an end effector 80 that includes a 6 by 6 array of end effector sections 82, each of which includes a vacuum cup 84. Again, each end effector section 82 may include pressure sensors as discussed above, and each vacuum cup 84 may include a deformation sensor that is able to detect deformation along any of three dimensions. The end effector sections 82 are mounted to a common base 86 that includes a coupling 88 for attachment to an articulated arm.

The 3×3 array that may, for example, handle up to 19.8 pound packages, and the 6×6 array that may handle up to 79.2 pounds. Such scaling of end effector sections may be made arbitrarily large, and of arbitrary shapes (if, for example, the known objects to be handled are of a particular shape as opposed to generally square/rectangular).

It is significant that by extrapolating the standard vacuum cell to arbitrary sizes/shapes, such an instrumented end effector may be designed for any given object or class of objects that shares all the benefits of such instrumentation as the above embodiments.

Those skilled in the art will appreciate that numerous variations and modifications may be made to the above disclosed embodiments without departing from the spirit and scope of the present invention.

What is claimed is:

1. An articulated arm system, comprising:
    an articulated arm including an end effector; and
    an articulated arm control system including:
        at least one sensor for sensing at least one of the position, movement or acceleration of the articulated arm;
        a main controller configured to automatically provide at least one main control signal that controls movement of the end effector; and
        an on-board controller mounted on the articulated arm proximate the end effector and the at least one sensor, wherein the on-board controller is configured to automatically provide, responsive to the at least one sensor, a motion control signal to the end effector that overrides the at least one main control signal from the main controller to change the movement of the end effector.

2. The articulated arm system as claimed in claim 1, wherein said motion control signal overrides the at least one main control signal from the main controller using a control junction through which the at least one main control signal passes.

3. The articulated arm system as claimed in claim 2, wherein said motion control signal overrides the at least one main control signal from the main controller to change any of the acceleration, orientation or position of the end effector.

4. The articulated arm system as claimed in claim 1, wherein said at least one sensor includes a plurality of sensors.

5. The articulated arm system as claimed in claim 4, wherein said plurality of sensors include any of flow sensors, pressure sensors, cameras, torque sensors and deformation sensors.

6. The articulated arm system as claimed in claim 1, wherein said end effector includes a plurality of end effector sections, each of which includes a vacuum cup.

7. The articulated arm system as claimed in claim 6, wherein each end effector section includes at least one pressure sensor.

8. The articulated arm system as claimed in claim 6, wherein said end effector sections are provided in an ordered array.

9. The articulated arm system as claimed in claim 6, wherein said end effector sections are provided in a 3 by 3 array.

10. The articulated arm system as claimed in claim 6, wherein said end effector sections are provided in a 6 by 6 array.

11. An articulated arm system, comprising:
    an articulated arm including an end effector; and
    an articulated arm control system including:
        at least one sensor for sensing at least one of the position, movement or acceleration of the articulated arm;
        a main controller configured to automatically provide at least one main control signal that controls movement of the end effector; and
        an on-board controller mounted on the articulated arm proximate the end effector and the at least one sensor, wherein the on-board controller is configured to automatically provide, responsive to the at least one sensor, a modifying control signal to the end effector that modifies the at least one main control signal from the main controller to change the movement of the end effector.

12. The articulated arm control system as claimed in claim 11, wherein said at least one sensor includes a plurality of sensors.

13. The articulated arm control system as claimed in claim 12, wherein said plurality of sensors each includes any of flow sensors, pressure sensors, cameras, torque sensors and deformation sensors.

14. A method of controlling an end effector of an articulated arm, comprising:

automatically providing a main control signal from a main controller to the end effector of the articulated arm via an on-board control system mounted on the articulated arm proximate the end effector, said main control signal for controlling movement of the end effector;

receiving by the on-board control system a sensor input signal from at least one sensor positioned proximate the end effector, said sensor input signal including information related to the position, movement or acceleration of the articulated arm; and at least partially modifying the main control signal by the on-board control system responsive to the sensor input signal to automatically provide a modified main control signal to the end effector from the on-board control system that changes the movement of the end effector.

15. The method as claimed in claim 14, wherein the sensor input signal is coupled to an on-board controller of the on-board control system.

16. The method as claimed in claim 15, wherein the on-board controller is mounted proximate the end effector.

17. A method of controlling an end effector of an articulated arm:

automatically providing a main control signal from a main controller to the end effector of the articulated arm via an on-board control system mounted on the articulated arm proximate the end effector, said main control signal for controlling movement of the end effector;

receiving by the on-board control system a sensor input signal from at least one sensor positioned proximate the end effector, said sensor input signal including information related to the position, movement or acceleration of the articulated arm; and overriding by the on-board control system the main control signal from the main controller to the end effector responsive to the sensor input signal to automatically change the movement of the end effector.

18. The method as claimed in claim 17, wherein said at least one sensor includes a plurality of sensors.

19. The method as claimed in claim 18, wherein said plurality of sensors each include any of flow sensors, pressure sensors, cameras, torque sensors and deformation sensors.

20. The method as claimed in claim 17, wherein the sensor input signal is coupled to an on-board controller of the on-board control system.

21. The method as claimed in claim 20, wherein the on-board controller is mounted proximate the end effector.

22. The articulated arm system as claimed in claim 1, wherein said main controller provides a plurality of main control signals to the end effector, and wherein the on-board controller provides a plurality of motion control signals to the end effector that are configured to override one or more of the plurality of main control signals.

23. The articulated arm system as claimed in claim 22, wherein the on-board controller provides the plurality of motion control signals that are configured to modify the one or more main control signals using control junctions.

24. The articulated arm system as claimed in claim 22, wherein at least one of the plurality of motion control signals are configured to override at least one of the plurality of main control signals that control an orientation of the end effector.

25. The articulated arm system as claimed in claim 22, wherein at least one of the plurality of motion control signals are configured to override at least one of the plurality of main control signals that are configured to cause the end effector to stop moving.

26. The articulated arm system as claimed in claim 11, wherein said modifying control signal from the on-board controller modifies the at least one main control signal from the main controller using a control junction through which the at least one main control signal passes.

27. The articulated arm system as claimed in claim 26, wherein said modifying control signal modifies the at least one main control signal from the main controller to change any of the acceleration, orientation or position of the end effector.

28. The articulated arm system as claimed in claim 11, wherein said main controller provides a plurality of main control signals to the end effector, and wherein the on-board controller provides a plurality of modifying control signals that are configured to modify one or more of the plurality of main control signals.

29. The articulated arm system as claimed in claim 28, wherein the on-board controller provides the plurality of modifying control signals that are configured to modify the one or more main control signals using control junctions.

30. The articulated arm system as claimed in claim 28, wherein at least one of the plurality of modifying control signals are configured to modify at least one of the plurality of main control signals that control an orientation of the end effector.

31. The method as claimed in claim 14, wherein the step of at least partially modifying the main control signal involves providing an on-board control signal to a control junction through which the main control signal passes.

32. The method as claimed in claim 14, wherein said method further includes the steps of providing a plurality of main control signals to the end effector, and providing a plurality of modifying control signals by the on-board control system that are configured to modify one or more of the plurality of main control signals.

33. The articulated arm system as claimed in claim 32, wherein the on-board system provides the plurality of modifying control signals that are configured to modify the one or more main control signals using control junctions.

34. The method as claimed in claim 32, wherein at least one of the plurality of modifying control signals are configured to modify at least one of the plurality of main control signals that control an orientation of the end effector.

35. The method as claimed in claim 17, wherein the step of overriding the main control signal involves using a control junction through which the main control signal passes.

36. The method as claimed in claim 17, wherein the method further includes the steps of providing a plurality of main control signals to the end effector, and providing a plurality of motion control signals that are configured to override one or more of the plurality of main control signals.

37. The method as claimed in claim 36, wherein the on-board control system provides the plurality of motion control signals that are configured to modify the one or more main control signals using control junctions.

38. The method as claimed in claim 36, wherein at least one of the plurality of motion control signals are configured to override at least one of the plurality of main control signals that control an orientation of the end effector.

39. The method as claimed in claim 36, wherein at least one of the plurality of motion control signals are configured to override at least one of the plurality of main control signals that are configured to cause the end effector to stop moving.

* * * * *

UNITED STATES PATENT AND TRADEMARK OFFICE
CERTIFICATE OF CORRECTION

| | |
|---|---|
| PATENT NO. | : 10,647,002 B2 |
| APPLICATION NO. | : 15/254592 |
| DATED | : May 12, 2020 |
| INVENTOR(S) | : Wagner et al. |

It is certified that error appears in the above-identified patent and that said Letters Patent is hereby corrected as shown below:

On the Title Page

Item (74), should read:
"Attorney, Agent, or Firm - Gesmer Updegrove, LLP"

Signed and Sealed this
Thirty-first Day of May, 2022

Katherine Kelly Vidal
*Director of the United States Patent and Trademark Office*